(12) United States Patent
Wilssens

(10) Patent No.: US 12,008,085 B2
(45) Date of Patent: *Jun. 11, 2024

(54) SERVER-SIDE AUDIO RENDERING LICENSING

(71) Applicant: MICROSOFT TECHNOLOGY LICENSING, LLC, Redmond, WA (US)

(72) Inventor: Steven Wilssens, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/747,138

(22) Filed: May 18, 2022

(65) Prior Publication Data

US 2022/0391475 A1    Dec. 8, 2022

Related U.S. Application Data

(63) Continuation of application No. 16/505,544, filed on Jul. 8, 2019, now Pat. No. 11,366,879.

(51) Int. Cl.
G06F 21/10        (2013.01)

(52) U.S. Cl.
CPC .......... *G06F 21/105* (2013.01); *G06F 21/101* (2023.08)

(58) Field of Classification Search
CPC .. G06F 21/105; G06F 21/101; G06F 21/1011; G06F 21/44

See application file for complete search history.

(56) References Cited

U.S. PATENT DOCUMENTS

| | | | | |
|---|---|---|---|---|
| 7,065,508 B2* | 6/2006 | Schull | ................... | G03B 13/02 |
| | | | | 705/55 |
| 7,966,111 B2* | 6/2011 | Moinzadeh | ............. | G06F 9/451 |
| | | | | 455/418 |
| 8,136,108 B2* | 3/2012 | Ha | ...................... | G06F 11/1433 |
| | | | | 717/176 |
| 8,391,775 B2* | 3/2013 | Moinzadeh | .......... | G11B 27/105 |
| | | | | 455/3.06 |
| 8,464,355 B2* | 6/2013 | Courtay | .................. | G06F 21/10 |
| | | | | 380/204 |
| 8,503,861 B2* | 8/2013 | Calhoon | ............ | H04N 21/2541 |
| | | | | 386/260 |

(Continued)

*Primary Examiner* — David Garcia Cervetti
(74) *Attorney, Agent, or Firm* — Newport IP, LLC; Jacob P. Rohwer

(57) ABSTRACT

A content server system is provided that includes at least one processor configured to store a user account for a user at a content server of the content server system that is configured to serve server-side rendered content to a client computing device of the user. Audio is played out via a sound output device associated with the client computing device. The at least one processor is further configured to determine a licensing identifier associated with a device of the user or the user account of the user, send the licensing identifier to a third-party licensing server device, receive an indication that an active license is associated with the licensing identifier, determine that the user is authorized to access a digital rights managed audio rendering software, and cause audio of the server-side rendered content to be rendered using audio rendering algorithms of the digital rights managed audio rendering software.

20 Claims, 8 Drawing Sheets

(56) References Cited

U.S. PATENT DOCUMENTS

| | | | | |
|---|---|---|---|---|
| 8,532,290 B2* | 9/2013 | Zollinger | G06F 21/10 | 713/193 |
| 8,676,135 B2* | 3/2014 | Hong | G11B 27/322 | 455/99 |
| 8,789,035 B2* | 7/2014 | McCarthy | G06F 8/65 | 717/172 |
| 8,831,823 B2* | 9/2014 | Moinzadeh | H04M 1/724098 | 340/5.1 |
| 8,839,005 B2* | 9/2014 | Elazar | G06Q 30/06 | 713/194 |
| 8,856,536 B2* | 10/2014 | Rabadi | H04L 9/30 | 713/193 |
| 8,942,888 B2* | 1/2015 | Garrett | G06F 17/00 | 340/426.2 |
| 8,966,248 B2* | 2/2015 | Baltes | H04L 9/3247 | 713/176 |
| 9,002,574 B2* | 4/2015 | Garrett | H04M 1/72463 | 340/426.2 |
| 9,003,558 B1* | 4/2015 | Dorwin | H04L 65/762 | 726/30 |
| 9,063,816 B2* | 6/2015 | Hobbet | G06F 8/65 | |
| 9,104,538 B2* | 8/2015 | Garrett | H04L 67/12 | |
| 9,128,796 B2* | 9/2015 | Chitre | G06F 8/65 | |
| 9,141,370 B1* | 9/2015 | Nay | G06F 8/61 | |
| 9,280,773 B1* | 3/2016 | Evans | G06Q 20/4014 | |
| 9,370,029 B2* | 6/2016 | O'Meara | H04L 67/56 | |
| 9,430,225 B2* | 8/2016 | Ko | G06F 8/658 | |
| 9,491,502 B2* | 11/2016 | Jacoby | H04N 21/4722 | |
| 9,524,160 B2* | 12/2016 | Takahashi | G06F 13/00 | |
| 9,542,406 B1* | 1/2017 | Bourbonnais | G06F 16/2365 | |
| 9,639,342 B2* | 5/2017 | Kryzer | G06F 8/65 | |
| 9,639,344 B2* | 5/2017 | Rockwell | G06F 8/65 | |
| 9,684,508 B2* | 6/2017 | Oku | G06F 8/65 | |
| 9,703,934 B1* | 7/2017 | Karnik | G06F 21/10 | |
| 9,715,581 B1* | 7/2017 | Estes | G06Q 30/0204 | |
| 9,734,119 B1* | 8/2017 | Chetverikov | G06F 13/4282 | |
| 9,753,719 B2* | 9/2017 | Hilliar | H04W 12/03 | |
| 9,952,850 B2* | 4/2018 | Joshi | G06F 11/1433 | |
| 9,996,339 B2* | 6/2018 | Agarwal | G06F 8/65 | |
| 10,042,629 B2* | 8/2018 | Sarkar | G06F 8/65 | |
| 10,095,502 B2* | 10/2018 | Chang | G06F 8/654 | |
| 10,157,050 B2* | 12/2018 | Kotani | G06F 8/654 | |
| 10,191,972 B2* | 1/2019 | Maher | G06Q 30/0251 | |
| 10,331,428 B1* | 6/2019 | Zalpuri | G06F 8/654 | |
| 10,358,116 B1* | 7/2019 | Jayaraman | H04L 67/306 | |
| 10,360,018 B2* | 7/2019 | Komano | H04W 4/48 | |
| 10,394,548 B2* | 8/2019 | Fox | B60W 50/02 | |
| 10,423,401 B2* | 9/2019 | Tschache | G06F 9/44536 | |
| 10,447,483 B1* | 10/2019 | Su | H04L 9/3226 | |
| 10,713,727 B1* | 7/2020 | Floyd | G07C 5/085 | |
| 10,719,501 B1* | 7/2020 | Leise | G06Q 40/00 | |
| 10,747,721 B2* | 8/2020 | Jang | G06F 1/1865 | |
| 10,805,068 B1* | 10/2020 | Leise | G06Q 40/08 | |
| 10,824,759 B1* | 11/2020 | Magerkurth | G06F 21/6209 | |
| 10,861,015 B1* | 12/2020 | Alt | G06Q 20/401 | |
| 11,599,653 B1* | 3/2023 | Magerkurth | H04L 9/0894 | |
| 2002/0046181 A1* | 4/2002 | Story, Jr. | G06F 21/10 | 705/59 |
| 2003/0055552 A1* | 3/2003 | Akins | F02D 41/2493 | 701/114 |
| 2005/0251487 A1* | 11/2005 | Evans | H04L 63/045 | 705/59 |
| 2006/0015465 A1* | 1/2006 | Kume | G06F 21/10 | 705/59 |
| 2006/0031222 A1* | 2/2006 | Hannsmann | G06Q 20/123 | |
| 2006/0075220 A1* | 4/2006 | Baugher | H04L 9/3271 | 713/156 |
| 2006/0106781 A1* | 5/2006 | Mori | G06F 16/282 | |
| 2007/0203846 A1* | 8/2007 | Kavuri | G06Q 50/184 | 705/59 |
| 2008/0114692 A1* | 5/2008 | Jogand-Coulomb | G06Q 10/10 | 705/59 |
| 2008/0114693 A1* | 5/2008 | Jogand-Coulomb | G06F 21/1075 | 705/59 |
| 2008/0147558 A1* | 6/2008 | Kraus | G06F 21/10 | 713/150 |
| 2008/0256645 A1* | 10/2008 | Choi | H04N 21/4627 | 380/44 |
| 2008/0271165 A1* | 10/2008 | Schnell | G06F 21/10 | 726/30 |
| 2009/0007240 A1* | 1/2009 | Vantalon | H04N 21/8355 | 726/4 |
| 2009/0024521 A1* | 1/2009 | Lim | G06Q 20/102 | 705/40 |
| 2009/0063350 A1* | 3/2009 | Briggs | H04L 63/10 | 705/59 |
| 2009/0124375 A1* | 5/2009 | Patel | G07F 17/32 | 463/29 |
| 2009/0138973 A1* | 5/2009 | Courtay | G06F 21/10 | 726/26 |
| 2009/0165080 A1* | 6/2009 | Fahn | G06F 21/10 | 726/1 |
| 2009/0228985 A1* | 9/2009 | Maurer | G06Q 30/06 | 726/26 |
| 2010/0131760 A1* | 5/2010 | Fujita | G06Q 30/06 | 713/168 |
| 2010/0324981 A1* | 12/2010 | Etchegoyen | G06F 21/10 | 705/14.16 |
| 2011/0055090 A1* | 3/2011 | Ross | G06Q 50/184 | 707/758 |
| 2011/0066838 A1* | 3/2011 | Takayama | H04L 9/3236 | 713/2 |
| 2011/0072269 A1* | 3/2011 | Takechi | G06F 21/10 | 713/150 |
| 2011/0184871 A1* | 7/2011 | Stahl | G06Q 10/06 | 705/310 |
| 2011/0268418 A1* | 11/2011 | Jones | H04L 12/1831 | 348/E7.083 |
| 2011/0289003 A1* | 11/2011 | Womack | G06F 21/105 | 705/310 |
| 2012/0060031 A1* | 3/2012 | Huang | H04N 21/63345 | 713/168 |
| 2012/0079607 A1* | 3/2012 | Lal | G06F 21/10 | 726/29 |
| 2012/0110342 A1* | 5/2012 | Agrawal | H04L 63/0478 | 713/189 |
| 2012/0124678 A1* | 5/2012 | Shintani | H04N 21/6547 | 705/30 |
| 2012/0155639 A1* | 6/2012 | Oney | H04N 21/63345 | 380/42 |
| 2012/0185695 A1* | 7/2012 | Shah | H04N 21/4623 | 713/172 |
| 2012/0216269 A1* | 8/2012 | Yeung | G06F 9/45558 | 726/26 |
| 2013/0125240 A1* | 5/2013 | Xu | G06F 21/105 | 726/26 |
| 2013/0167253 A1* | 6/2013 | Seleznev | G06F 21/10 | 726/29 |
| 2013/0262472 A1* | 10/2013 | Watanabe | G06F 16/2255 | 707/747 |
| 2013/0312112 A1* | 11/2013 | Troiano | G06F 21/10 | 726/26 |
| 2014/0041045 A1* | 2/2014 | McConnell | G06F 21/10 | 726/27 |
| 2014/0068260 A1* | 3/2014 | Oney | H04L 63/0457 | 713/168 |
| 2014/0075188 A1* | 3/2014 | Yin | G06F 21/10 | 713/168 |
| 2014/0195589 A1* | 7/2014 | Devereaux | H04L 67/1097 | 709/203 |
| 2014/0195594 A1* | 7/2014 | Ahuja | A63F 13/355 | 709/203 |
| 2014/0259182 A1* | 9/2014 | Mershon | G06F 21/1011 | 726/28 |
| 2014/0273966 A1* | 9/2014 | Hansen | G06F 21/44 | 455/411 |

(56) References Cited

U.S. PATENT DOCUMENTS

| | | | |
|---|---|---|---|
| 2014/0343787 A1* | 11/2014 | Mabuchi | H04L 67/12 701/31.7 |
| 2015/0066783 A1* | 3/2015 | Mohan | G06Q 30/0601 705/310 |
| 2015/0082395 A1* | 3/2015 | Zhu | H04L 12/2821 726/4 |
| 2015/0172995 A1* | 6/2015 | Delattre | H04L 45/70 370/218 |
| 2015/0220881 A1* | 8/2015 | Geisert | G06Q 10/10 705/59 |
| 2016/0044137 A1* | 2/2016 | Nakazawa | H04L 67/02 709/203 |
| 2016/0080279 A1* | 3/2016 | Tan | H04L 67/12 370/328 |
| 2016/0112201 A1* | 4/2016 | Misawa | H04L 9/30 713/168 |
| 2016/0191433 A1* | 6/2016 | Song | H04L 63/10 709/206 |
| 2016/0294790 A1* | 10/2016 | Susan | H04W 12/126 |
| 2016/0321443 A1* | 11/2016 | Ishibashi | G06F 21/45 |
| 2016/0350325 A1* | 12/2016 | Wang | G06F 3/0619 |
| 2016/0371468 A1* | 12/2016 | Daniel | G06F 21/10 |
| 2017/0011606 A1* | 1/2017 | Ceccon | G07G 1/0054 |
| 2017/0138771 A1* | 5/2017 | Kim | G01D 18/00 |
| 2017/0150289 A1* | 5/2017 | Baalu | H04L 67/10 |
| 2017/0228525 A1* | 8/2017 | Wajs | H04L 9/3226 |
| 2017/0235970 A1* | 8/2017 | Conner | G06F 21/44 707/690 |
| 2017/0324558 A1* | 11/2017 | Takemori | G06F 21/575 |
| 2017/0329599 A1* | 11/2017 | Choi | A61B 6/563 |
| 2017/0344728 A1* | 11/2017 | Steele | H04L 9/3231 |
| 2017/0357785 A1* | 12/2017 | Kim | H04L 9/0894 |
| 2017/0374484 A1* | 12/2017 | Lando | G10L 19/008 |
| 2018/0145991 A1* | 5/2018 | McCauley | H04L 9/0891 |
| 2018/0176229 A1* | 6/2018 | Bathen | H04L 9/3239 |
| 2018/0190279 A1* | 7/2018 | Anderson | G10L 15/22 |
| 2018/0225051 A1* | 8/2018 | Vansa | G06F 16/273 |
| 2018/0245559 A1* | 8/2018 | Kang | G07C 9/00174 |
| 2018/0329907 A1* | 11/2018 | De Paris | G06F 16/2379 |
| 2018/0373847 A1* | 12/2018 | Lo | H04W 12/08 |
| 2019/0020468 A1* | 1/2019 | Rosenoer | H04L 9/3228 |
| 2019/0079950 A1* | 3/2019 | Ramabaja | H04L 9/0637 |
| 2019/0114397 A1* | 4/2019 | Terry | H04L 63/20 |
| 2019/0147065 A1* | 5/2019 | Maeda | H04L 9/3239 380/37 |
| 2019/0155513 A1* | 5/2019 | Maeda | G06F 3/0641 |
| 2019/0187971 A1* | 6/2019 | Wang | H04W 12/06 |
| 2019/0193653 A1* | 6/2019 | Nakamura | G06F 9/4893 |
| 2019/0213462 A1* | 7/2019 | McDonald | G06Q 30/018 |
| 2019/0238555 A1* | 8/2019 | Buffard | H04L 67/12 |
| 2019/0253253 A1* | 8/2019 | Yang | G16H 10/60 |
| 2019/0294582 A1* | 9/2019 | Zhu | H04L 67/1095 |
| 2019/0327509 A1* | 10/2019 | Lenhart | H04N 21/4627 |
| 2019/0340098 A1* | 11/2019 | Green, III | G06F 11/3495 |
| 2019/0362683 A1* | 11/2019 | Ikeda | G09G 3/3688 |
| 2020/0034458 A1* | 1/2020 | Mehta | G06F 16/2255 |
| 2020/0036789 A1* | 1/2020 | Mehta | G06F 16/27 |
| 2020/0073993 A1* | 3/2020 | Mutreja | G06F 16/273 |
| 2020/0167339 A1* | 5/2020 | Manevich | H04L 9/0643 |
| 2020/0175590 A1* | 6/2020 | Huo | H04L 9/50 |
| 2020/0204400 A1* | 6/2020 | Skertic | H04L 9/3239 |
| 2020/0210623 A1* | 7/2020 | Bueno | H04L 9/3247 |
| 2020/0233940 A1* | 7/2020 | Edwards | H04L 9/0637 |
| 2020/0250201 A1* | 8/2020 | Cantwell | H04L 41/145 |
| 2020/0259633 A1* | 8/2020 | Gallagher-Lynch | H04L 9/3297 |
| 2020/0293500 A1* | 9/2020 | Patil | H04L 9/3239 |
| 2020/0364317 A1* | 11/2020 | Phirmis | G06F 21/44 |
| 2020/0387421 A1* | 12/2020 | Domeki | G06F 11/0751 |
| 2020/0412525 A1* | 12/2020 | Katsak | H04L 9/50 |
| 2021/0004181 A1* | 1/2021 | Lakshman | G06F 3/0608 |
| 2021/0044850 A1* | 2/2021 | Gala | G06F 21/10 |
| 2021/0157529 A1* | 5/2021 | Sakurai | B60R 16/03 |
| 2021/0176581 A1* | 6/2021 | Tsuji | H04S 7/00 |
| 2021/0176582 A1* | 6/2021 | Hatanaka | H04S 7/303 |
| 2021/0303384 A1* | 9/2021 | Smaalders | G06F 11/366 |
| 2021/0367790 A1* | 11/2021 | Zhuo | G06F 21/64 |
| 2022/0224548 A1* | 7/2022 | Mondello | H04L 9/3263 |

* cited by examiner

SERVER-SIDE AUDIO RENDERING LICENSING

CROSS-REFERENCE TO RELATED APPLICATION

This application is a continuation of U.S. patent application Ser. No. 16/505,544, filed Jul. 8, 2019, the content of which application is hereby expressly incorporated herein by reference in its entirety.

BACKGROUND

Thin client computing devices and mobile computing devices often lack the processor power required to run applications that have high CPU and GPU requirements. However, server-side rendering techniques that execute these applications on a cloud platform and provide the rendered visuals and audio for the application to the client computing device may allow users to engage with these applications even though their client computing device does not meet the required hardware specifications for that application. These server-side rendering techniques may use audio rendering software that is licensed various licensing processes and agreements.

SUMMARY

A content server system is provided that may comprise at least one processor that may be configured to store a user account for a user at a content server of the content server system that may be configured to serve server-side rendered content to a client computing device of the user. Audio from the server-side rendered content may be played out via a sound output device associated with the client computing device. The at least one processor may be further configured to determine a licensing identifier associated with a device of the user or the user account of the user, send the licensing identifier to a third-party licensing server device, receive an indication that an active license is associated with the licensing identifier, determine that the user is authorized to access a digital rights managed audio rendering software based on the indication that an active license is associated with the licensing identifier, and cause audio of the server-side rendered content to be rendered using audio rendering algorithms of the digital rights managed audio rendering software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
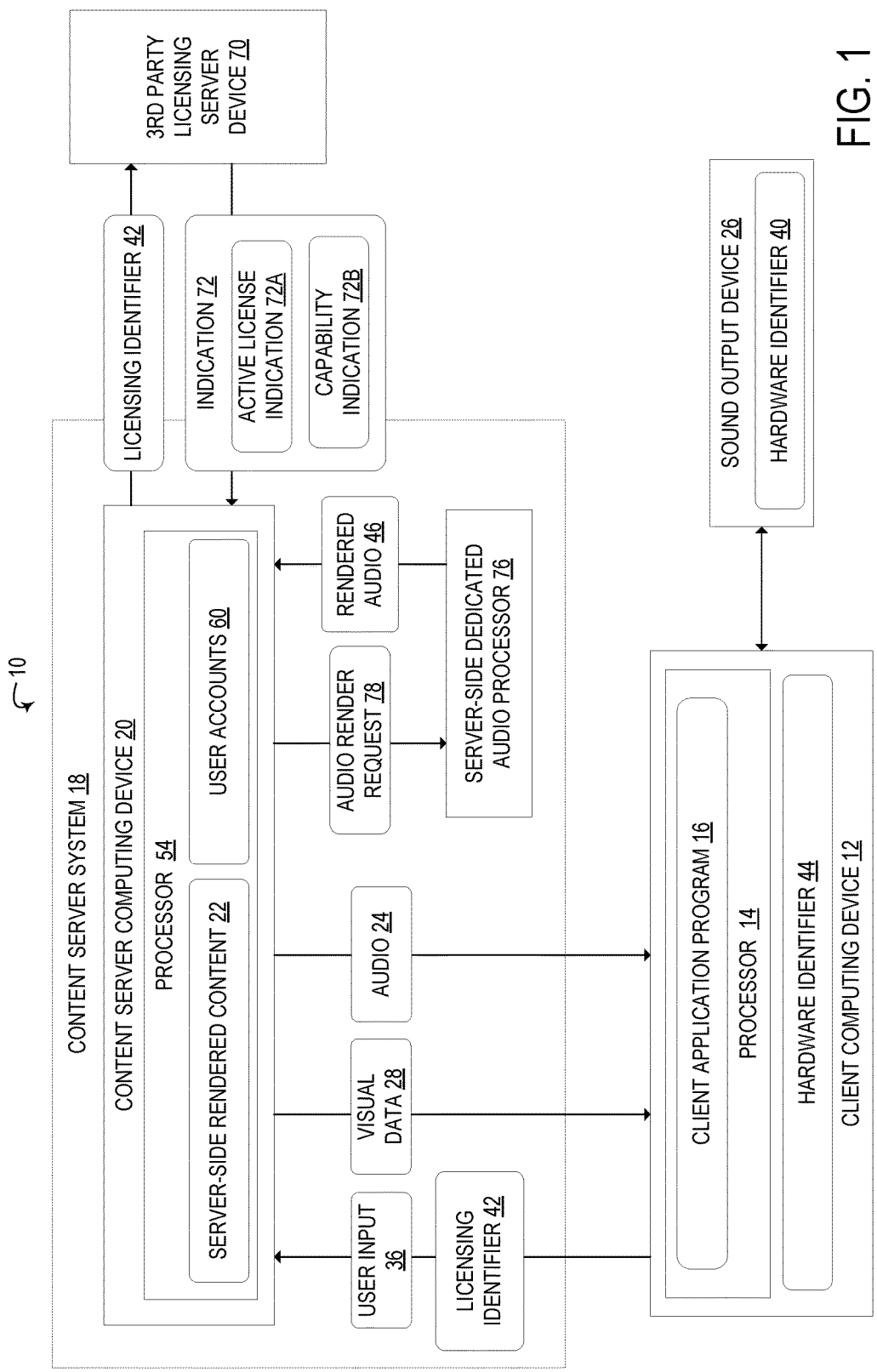
FIG. 1 shows a schematic view of an example computing system for rendering audio for a server-side rendered application program using digital rights managed audio rendering software according to one example of the present disclosure.

FIG. 1 illustrates a computing system 10 that determines whether a user is permitted to use digital rights managed (DRM) audio rendering software for rendering audio that may be played out to a user of a client computing device 12. As illustrated, a processor 14 of the client computing device 12 may be configured to execute a client application program 16 that communicates with a content server system 18 of the computing system 10. In one example, the content server system 18 includes a plurality of content server computing devices 20 that are collectively configured to operate in a cloud computing configuration.

In one example, each content server computing device 20 may be configured to execute separate instances of a server-side application program for serving server-side rendered content 22 to the client computing device 12, the server-side rendered content 22 include audio 24 that may be played out via a sound output device 26 associated with the client computing device 12. In one specific example, the server-side rendered content 22 may take the form of a game application that includes both audio content and visual content. In this example, the content server system 18 may be configured to render both audio 24 and visual data 28 that may be sent to the client application program 16 executed by the client computing device 12. However, it should be appreciated that the server-side rendered content 12 may take other suitable forms, such as, for example, an audio or music application that does not include server-side rendered visuals.

Figure 2:
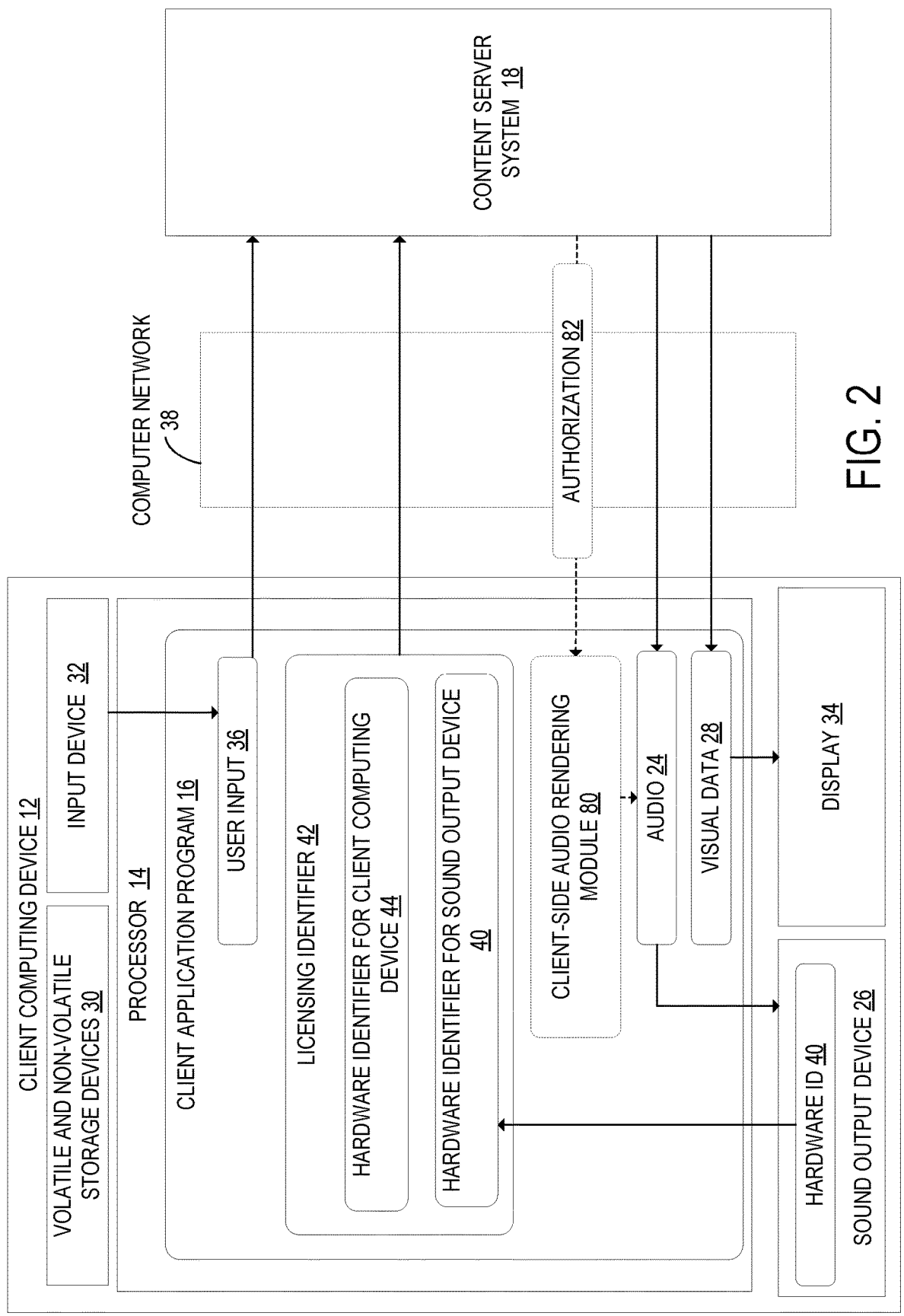
FIG. 2 shows a schematic view of a client computing device of the example computing system of FIG. 1.

FIG. 2 illustrates an example client computing device 12 that is configured to communicate with the content server system 18. The client computing device 12 may include a processor 14, volatile and non-volatile storage devices 30, one or more input devices 32, a display 34, a sound output device 26, and other suitable computing components. In one example, the client computing device 12 may take the form of a mobile computing device such as a smart phone having a capacitive touch display that includes both the input device 32 and the display 34. In this example, the sound output device 26 may include speakers integrated into a housing of the mobile computing device. As another example, the sound output device 26 may include headphone, headset, or earbud devices that are coupled to the client computing device 12 by wired or wireless mediums. In another example, the client computing device 12 may take the form of a thin client computing device, a game console, a head mounted display device, or any other suitable type of computing device configured to present rendered audio and/or visuals to a user.

The processor 14 of the client computing device 12 may be configured to execute the client application program 16. In the illustrated example, the client application program 16 may be configured to receive a stream of rendered audio 24 and a stream of rendered visual data 28 from the content server system 18. The client application program 16 may include a graphical user interface (GUI) that is presented via the display 34. The user may interact with the client application program 16 via the one or more input devices 32 of the client computing device 12. For example, user inputs 36 received via the one or more input devices 32 may be sent in a stream of user inputs 36 to the content server system 18 over a computer network 38. Application logic, application state, and application rendering for the server-side rendered content 22 may be handled in the background by one or more content server computing devices 20 of the content server system 18 to generate rendered audio 24 and visual data 28, which may be sent back to the client computing device 12 in a server-side rendering configuration.

The audio 24 may be rendered using audio rendering algorithms of one or more digital rights managed audio rendering software. The digital rights managed audio rendering software may be owned by a third party that has original equipment manufacturer (OEM) licensing agreements with different manufacturers to allow use of the third party's digital rights managed audio rendering software on specific products or equipment produced by those manufacturers. For example, the third party and a manufacturer of a particular line of headsets may have a licensing agreement to permit use of the digital rights managed audio rendering software for each headset of that brand of headsets.

The third party may have OEM licensing agreements with manufacturers of other types of sound output devices 26, such as, for example, speakers, headphones, earbuds, home theater sound systems, etc. The third party may also have OEM licensing agreements with manufacturers of the client computing device 12 which may take the form of a game console, a mobile computing device, a thin client computing device, etc. However, it should be appreciated that the third party may have other types of licensing agreements that permit users to use the digital rights managed audio rendering software owned by the third party. In these OEM licensing agreements, the manufacturer may provide the third party with a list of hardware identifiers or another method of identifying headsets in the OEM licensed brand of headsets.

The client application program 16 may be configured to detect one or more sound output devices 26 that are communicatively coupled to the client computing device. In one example, the client application program 16 may be configured to detect a sound output device 26 that is currently enabled for audio playout for the client computing device 12. That is, the sound output device 26 that selected for audio playout by the client computing device 12. In another example, a plurality of sound output devices 26 may be communicatively coupled to the client computing device 12, such as, for example, a mobile computing device that includes integrated speakers and is wirelessly coupled to a headset. In this example, the client computing device 12 may be configured to detect each sound output device 26, and identify the particular sound output device 26 that is currently enabled for audio playout.

The sound output device 26 may include a hardware identifier 40 that may be stored in memory of the sound output device 26 and retrievable by the client computing device 12. The hardware identifier 40 may, for example, take the form of a serial number set by the manufacturer, or another type of identifier. As discussed above, the manufacturer of the sound output device 26 may have a licensing agreement with the third party of the digital rights managed audio rendering software which may permit the sound output devices 26 specified in the agreement to playout audio that is rendering using the digital rights managed audio rendering software. These sound output devices 26 may be identified via a licensing identifier 42. In one example, the licensing identifier 42 may take the form of the hardware identifier 40 of the sound output device 26 associated with the client computing device 12. That is, the permitted set of sound output devices 26 under the licensing agreement may be specified by their hardware identifiers 40. In this example, the client application program 16 may be configured to programmatically retrieve the licensing identifier 42, such as the hardware identifier 40, from a storage device of the sound output device 26. The retrieved licensing identifier 42 may be sent to the content server system 18 over the computer network 28 for verification. When multiple sound output devices 26 are coupled to the client computing device 12, the client application program 16 may be configured to send a hardware identifier 40 for the currently enabled sound output device 26 to the content server system 18, or may be configured to sent hardware identifiers 40 for each sound output device 26 alongside an indication of the currently enabled sound output device.

In another example, the third party may have a licensing agreement with the manufacturer of the client computing device 12. In this example, the licensing identifier 42 that may be used to verify whether the client computing device 12 is permitted to use the digital rights managed audio rendering software may take the form of a hardware identifier 44 of the client computing device 12. The hardware identifier 44 of the client computing device 12 may take the form of a manufacturer serial number or another type of hardware identifier for the client computing device 12, and may be a globally unique identifier (GUID). In this example, the client application program 16 may be configured to programmatically retrieve the licensing identifier 42, such as the hardware identifier 44, from memory of the client computing device 12, and send the licensing identifier 42 to the content server system 18 over the computer network 38.

It should be appreciated that the example licensing agreements and licensing identifiers 42 described above are merely exemplary, and that the licensing identifier 42 may take other suitable forms. For example, the third party may have licensing agreements with manufacturers of specific computer components of the client computing device 12, such as, for example, a manufacturer of a sound processing device included in the client computing device 12. In this example, the licensing identifier 42 may take the form of a hardware identifier, or another type of identifier, of the sound processing device.

Figure 3:
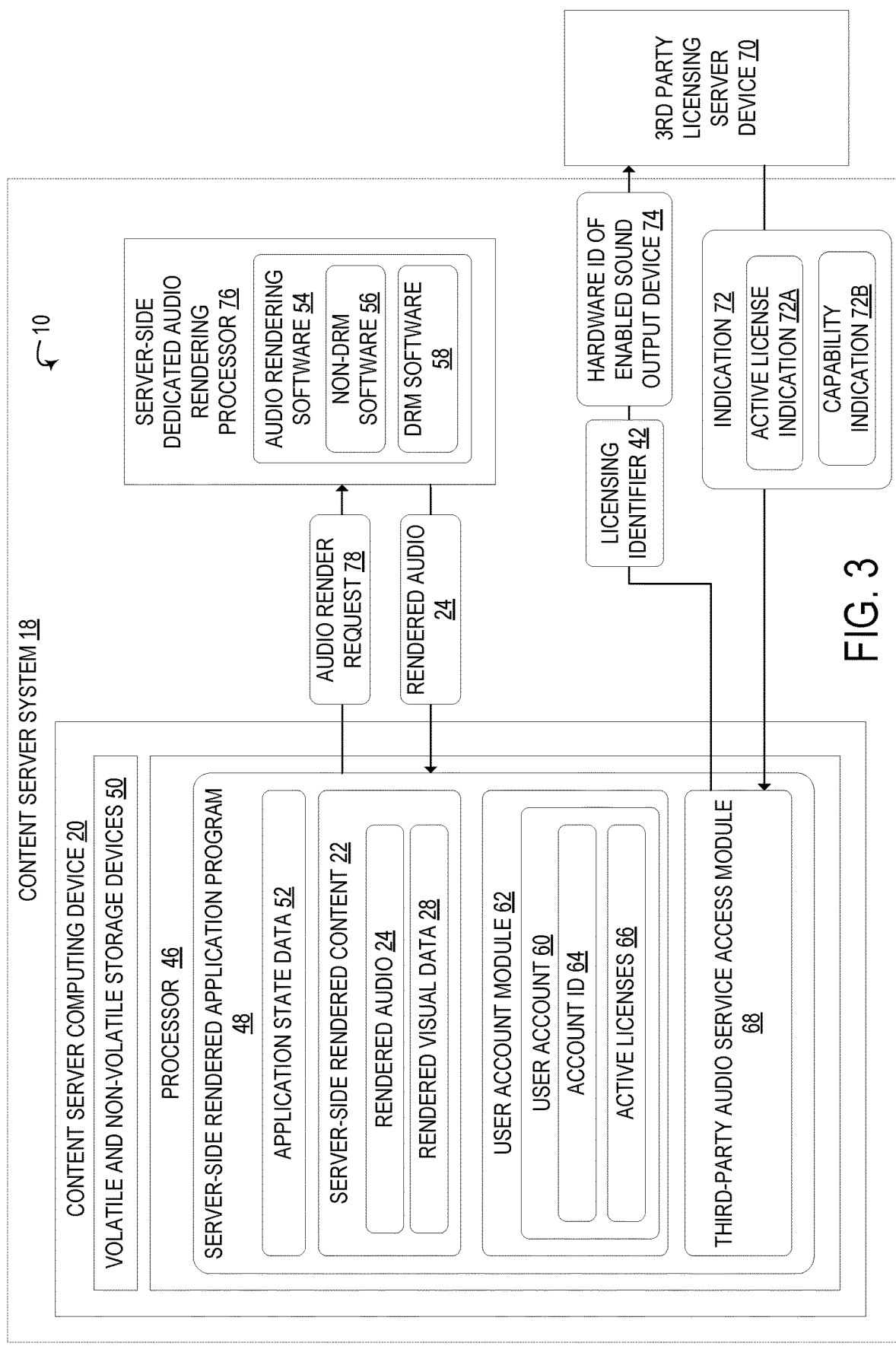
FIG. 3 shows a schematic view of a content server system of the example computing system of FIG. 1.

FIG. 3 illustrates an example content server computing device 20 of the content server system 18. The content server computing device 20 may include a processor 46 configured to execute a server-side rendered application program 48 that is configured to serve server-side rendered content 22 to the client computing device 12 of the user. As shown, the server computing device 22 may also include volatile and non-volatile storage devices 50, and other suitable computing components. based on the user input 50.

The server-side rendered content 22 may include rendered audio 24 configured to be played out via the sound output device 26 associated with the client computing device 12. In one example, the server-side rendered application program 48 may take the form of a game application, and the server-side rendered content 22 may include rendered visual data 28. The server-side rendered content 22 may be rendered based on application state data 52 that indicates a current state of the server-side rendered application program 48 for a current session with the client application program 16. The application state data 52 may be updated in response to application logic of the server-side rendered application program 48 and the stream of user input 36 received from the client computing device 12. For example, in a game application, the application state data 48 may indicate a current state of the game world including a user's character that may be controlled based on the user input 36. The server-side rendered content 22 may be streamed from the content server computing device 20 to the associated client application program 16 for presentation to the user.

The content server system 18 may be configured to render the audio 24 of the server-side rendered content 22 using different types of audio rendering software 54. For example, the audio 24 may be rendered using a non-digital rights managed audio rendering software 56, such as an open sourced audio rendering software or a first-party audio rendering software of the content server system 18. As another example, the audio 24 may be rendered using third-party digital rights managed audio rendering software 58, such as, for example, DOLBY ATMOS, DTS:X, and other third-party digital rights managed audio rendering software. Before rendering the audio 24 using a digital rights managed audio rendering software 58, the content server computing device 20 may be configured to verify whether the user is permitted to use the digital rights managed audio rendering software 58.

The content server computing device 20 may be configured to track the user's licensing permissions in a user account 60 for the user that is stored at a content server of the content server system 18. In one example, the user account 60 may be stored at a user account module 62 of the server-side rendered application program 48. In a cloud computing example, the content server system 18 may include a separate user account server that stores and manages a plurality of user accounts 60. In this example, the user account module 62 of the content server computing device 20 may be configured to access the user account server of the content server system 18 to retrieve data for the user account 60. Each user of the content server system 18 may have individual user accounts 60 with different user account identifiers 64.

The user account 60 for the user may include a set of active licenses 66 for the user. The active licenses 66 may indicate whether the user is permitted to use the third-party digital rights managed audio rendering software 58. The active licenses 66 may be determined by a third-party audio service access module 68 configured to communicate with a third-party licensing server 70. For example, the third-party digital rights managed audio rendering software 58 may be DOLBY ATMOS, and the third-party licensing server 70 may be a DOLBY server that may be accessed by the third-party audio service access module 68 of the server-side rendered application program.

To determine the active licenses 66 associated with the user, the content server computing device 20 may be configured to determine a licensing identifier 42 associated with the user. In one example, the licensing identifier 42 may be stored at the sound output device 26 or client computing device 12 in the form of hardware identifiers 40 and 44 and received at the content server system 18. In another example, the licensing identifier 42 may be the account identifier 64 associated with the user account 60 for the user stored by the content server system 18. For example, the content server system 18 may provide a graphical user interface (GUI) front-end that may be accessed by the user. The user may access their user account 60 via the GUI front-end, such as, for example, via a log-in process. After logging into their user account 60, the user may purchase or otherwise obtain a license for one or more digital rights managed audio rendering software 58 owned by one or more third parties via the GUI front-end. As another example, the user may obtain a code from the third party that may be entered via the GUI front-end to active a license for the software of that third-party. After purchasing or otherwise obtaining a license from the third party though the GUI front-end, the user account 60 may be associated with the active license 66 with the third-party. In this example, licensing identifier 42 may take the form of the account identifier 64 of the user account 60.

The content server computing device 20 may be configured to send the licensing identifier 42 to a third-party licensing server 70 via the third-party audio service access module 68. The third-party licensing server 70 may be configured to compare the licensing identifier 42 against a database to determine whether an active license 66 is associated with the licensing identifier 42. As discussed above, these licenses may include OEM licensing agreements with manufacturers of the sound output device 26, the client computing device 12, or other hardware components included in the client computing device 12. The license may also be individually purchased or otherwise obtained by the user and associated with the user account 60 on the content server system 18. However, it should be appreciated that the third-party licensing server 70 may determine licenses through other processes. For example, as a promotion, the third-party licensing server 70 may determine that all user accounts 60 on the content server system 18 are permitted access to the digital rights managed audio rendering software 58 for a specified week of the year. Thus, the third-party licensing server 70 may control their active licenses 66 in an extensible manner such that licenses may be added, removed, and modified by the third-party licensing server 70.

The content server computing device 20 may be configured to receive, from the third-party licensing server device 70, an indication 72 that an active license 66 is associated with the licensing identifier 42. Based on receiving this indication 72, the content server computing device 20 may update the active licenses 66 associated with the user account 60 to indicate that the user is authorized to access the digital rights managed audio rendering software 58. In one example, the content server system 18 may be configured to render audio using a plurality of different digital rights managed audio rendering software 58 owned by different third-parties. The content server computing device 20 may be configured to send the licensing identifier 42 to a plurality of different third-party licensing servers 70 associated with the plurality of different digital rights managed audio rendering software 58, and update the active licenses 66 for the user's account 60 for each digital rights managed audio rendering software 58.

As another example, the user account module 62 may store a second user account for a second user, and may send the second licensing identifier 42 to the third-party licensing server 70 according to the same process discussed above. However, in this example, if the second user does not have an active license with the third-party that owns the digital rights managed audio rendering software 58, then the third-party licensing server 70 may send back an indication 72 that an active license 66 is not associated with the second licensing identifier 42. In this example, the content server computing device 20 may determine that the user is not authorized to access the digital rights managed audio rendering software 58.

The active licenses 66 for the user account 60 of the user may be updated periodically and when new sound output devices 26 or other hardware devices are connected to the client computing device 12. If the user account 60 currently has an active license 66 for the digital rights managed audio rendering software 58, the content server computing device 20 may be configured to cause audio 24 of the server-side rendered content 22 to be rendered using audio rendering algorithms of the digital rights managed audio rendering software 58. On the other hand, if the user account 60 does not have an active license 66 for the digital rights managed audio rendering software 58, the content server computing device 20 may be configured to cause audio 24 of the server-side rendered content 22 to be rendered using audio rendering algorithms of a non-digital rights managed audio rendering software 56.

In one example, while the user account 60 for the user may have an active license 66 for the digital rights managed audio rendering software 58, the currently enable sound output device 26 coupled to the user's client computing device 12 may not be capable of playing out audio that is rendered using the digital rights managed audio rendering software 58. For example, the user may have purchased a license for a digital rights managed audio rendering software 58 that their currently enabled sound output device 26 is incapable of outputting. The content server computing device 20 may be further configured to receive a hardware identifier 74 for the sound output device 26 that is currently enabled for audio playout for the client computing device 12, and send the hardware identifier 74 to the third-party licensing server device 70. The third-party licensing server device 70 may be configured to determine whether the sound output device 26 indicated by the hardware identifier 74 is capable of using the digital rights managed audio rendering software 58, and send a indication 72B of whether or not the sound output device 26 is capable.

In one example, if the content server computing device 20 receives, from the third-party licensing server device 70, an indication 72B that the sound output device 26 is not capable of outputting audio that is rendered using audio rendering algorithms of the digital rights managed audio rendering software 58, then the content server computing device 20 may be configured to prevent audio of the server-side rendered content 22 from being rendered using audio rendering algorithms of the digital rights managed audio rendering software 58. The content server computing device 20 may select a non-digitally right managed audio rendering software 56 that the sound output device 26 is capable of using for rendering the audio 24.

On the other hand, the content server computing device 20 receives an indication 72A that an active license 66 is associated with the licensing identifier 42, and an indication 72B that the currently enable sound output device 26 is capable of playing out audio rendered using the digital rights managed audio rendering software 58, then the content server computing device 20 may be configured to cause the audio 24 of the server-side rendered content 22 to be rendered using the digital rights managed audio rendering software 58.

In one example, the audio 24 may be rendered by a rendering module of the server-side rendered application program 48 executed by the at least one processor 46 of the content server computing device 20. In another example, the content server system 18 may include a server-side dedicated audio rendering processor 76 configured to perform the audio rendering algorithms of the non-digital rights managed and digital right managed audio rendering software 56 and 58. To render audio 24 of the server-side rendered content 22, the content server computing device 20 may be configured to send an audio render request 78 to the server-side dedicated audio rendering processor 76 that includes sound data from the application state data 52 that will be rendered by the server-side dedicated audio rendering processor 76. The audio render request 78 may also include the active licenses 66 from the user's user account 60 that indicates whether the user is permitted access to the digital rights managed audio rendering software 58. The audio 24 may be rendered by the dedicated audio rendering processor 76 of the content server system 18 using the digital rights managed audio rendering software 58 if permitted, or by the non-digital rights managed audio rendering software 56 if the user is not permitted to the use the digital rights managed audio rendering software 58. The rendered audio 24 may be streamed to the client computing device 12 over a computer network 38 for playout via the sound output device 26. Rendering audio using the dedicated audio rendering processor 76 may reduce the computational burden on the at least one processor 46 of the content server computing device 20.

Turning back to FIG. 2, in a non-server-side rendered configuration, the audio played out from the sound output device 26 may be rendered by a client-side audio rendering module 80 of the client application program 16. In this example, the client application program 16 may include the application state data 52 discussed above with reference to the server-side rendered application program 48, and may be configured to render the audio and visual data for the application. The client-side audio rendering module 80 may be configured to perform the audio rendering algorithms of the non-digital rights managed and the digital rights managed audio rendering software 56 and 58. Before rendering using the digital rights managed audio rendering software 58, the client application program 16 may be configured to communicate with the content server system 18 to determine whether the user has an active license 66 for the digital rights managed audio rendering software 58. If the user has an active license 66 associated with the user account 60, the content server system 18 may be configured to send an authorization 82 to the client computing device 12 to cause the client computing device 12 to render audio 24 using audio rendering algorithms of the digital rights managed audio rendering software 58. If the client computing device 12 does not receive the authorization 82, then the client-side audio rendering module 80 may be configured to render the audio 24 using the non-digital rights managed audio rendering software.

Figure 4:
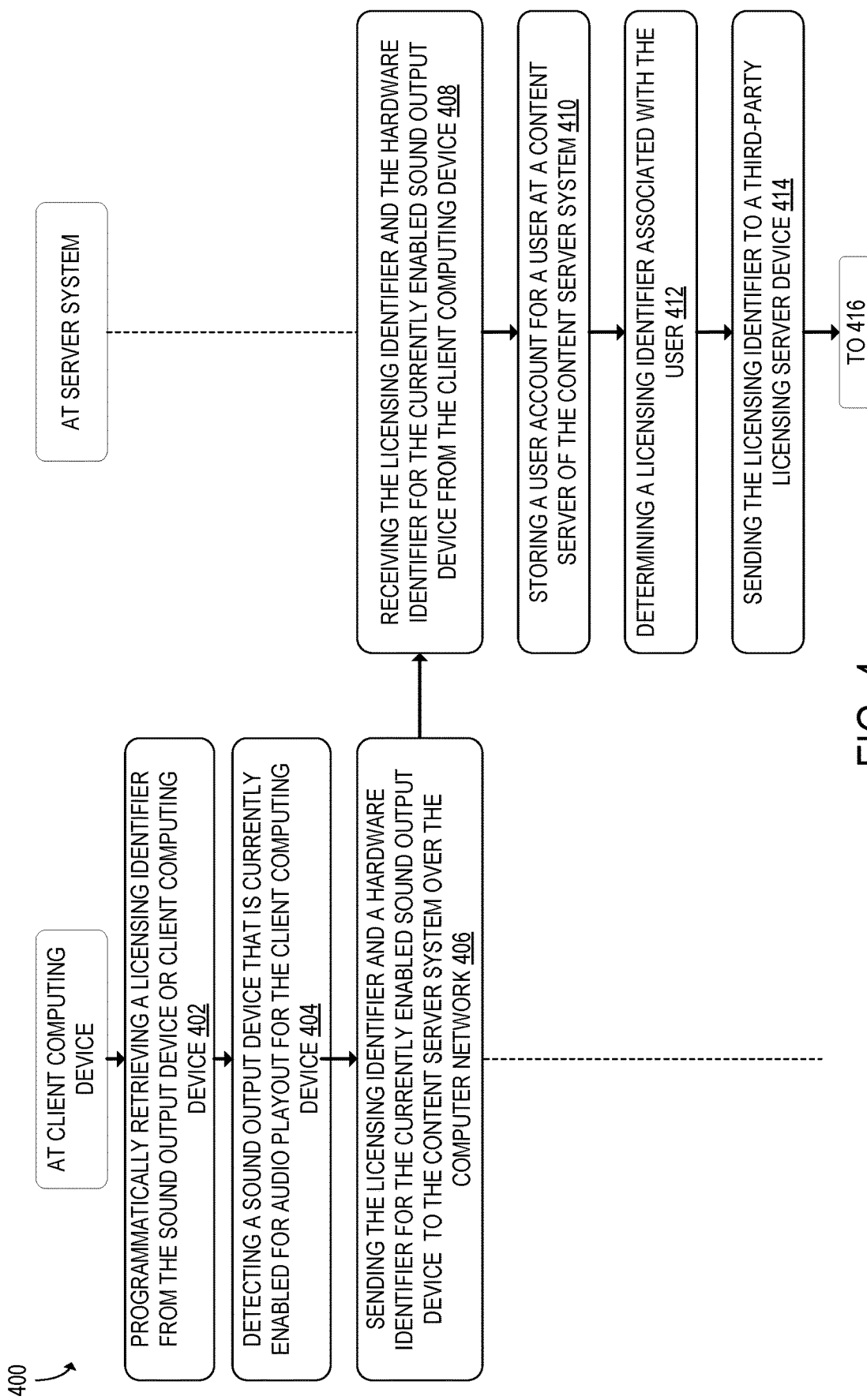
FIG. 4 shows an example method for rendering audio for a server-side rendered application program using digital rights managed audio rendering software that may be implemented by the computing system of FIG. 1.
Figure 5:
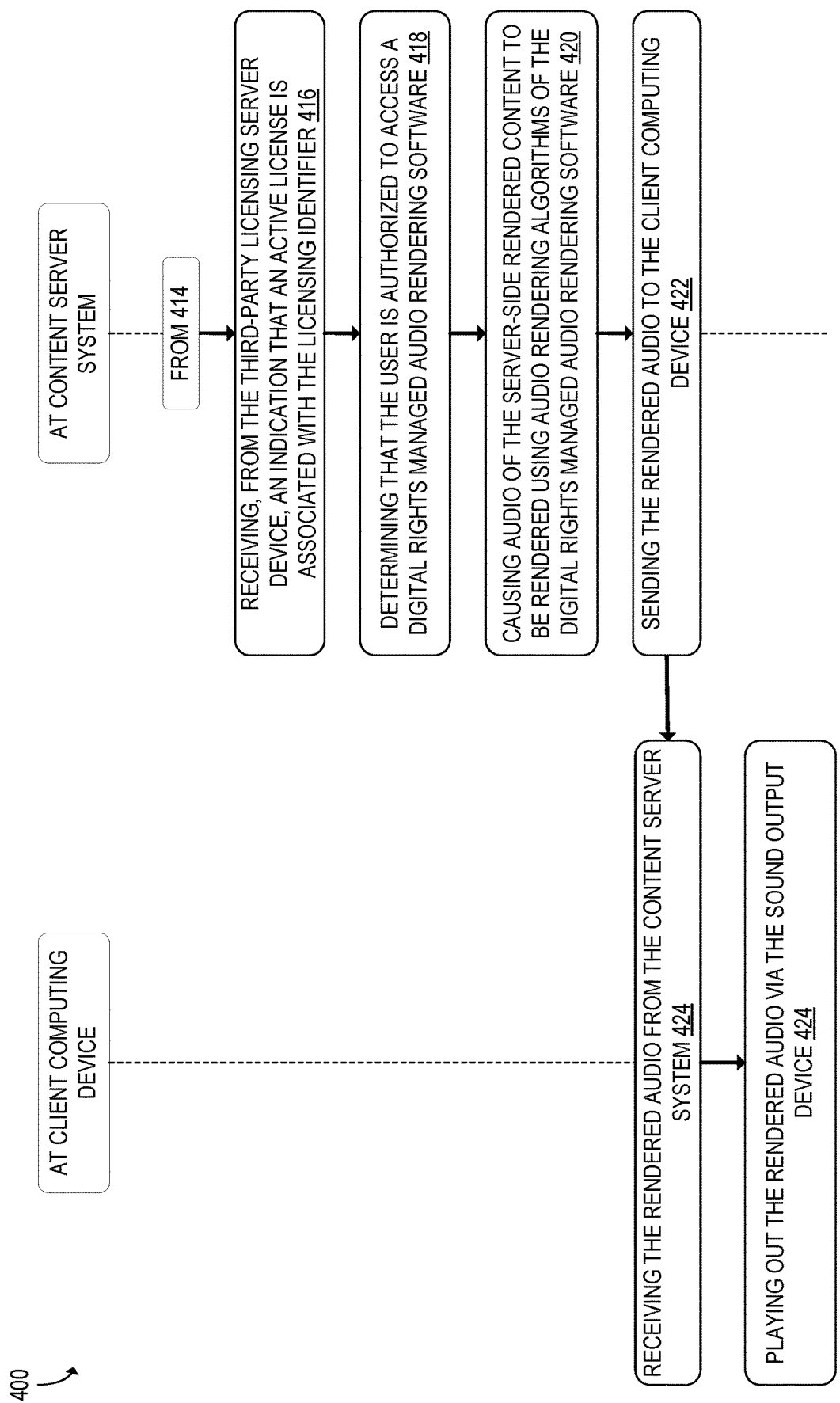
FIG. 5 continues the example method of FIG. 4.
Figure 6:
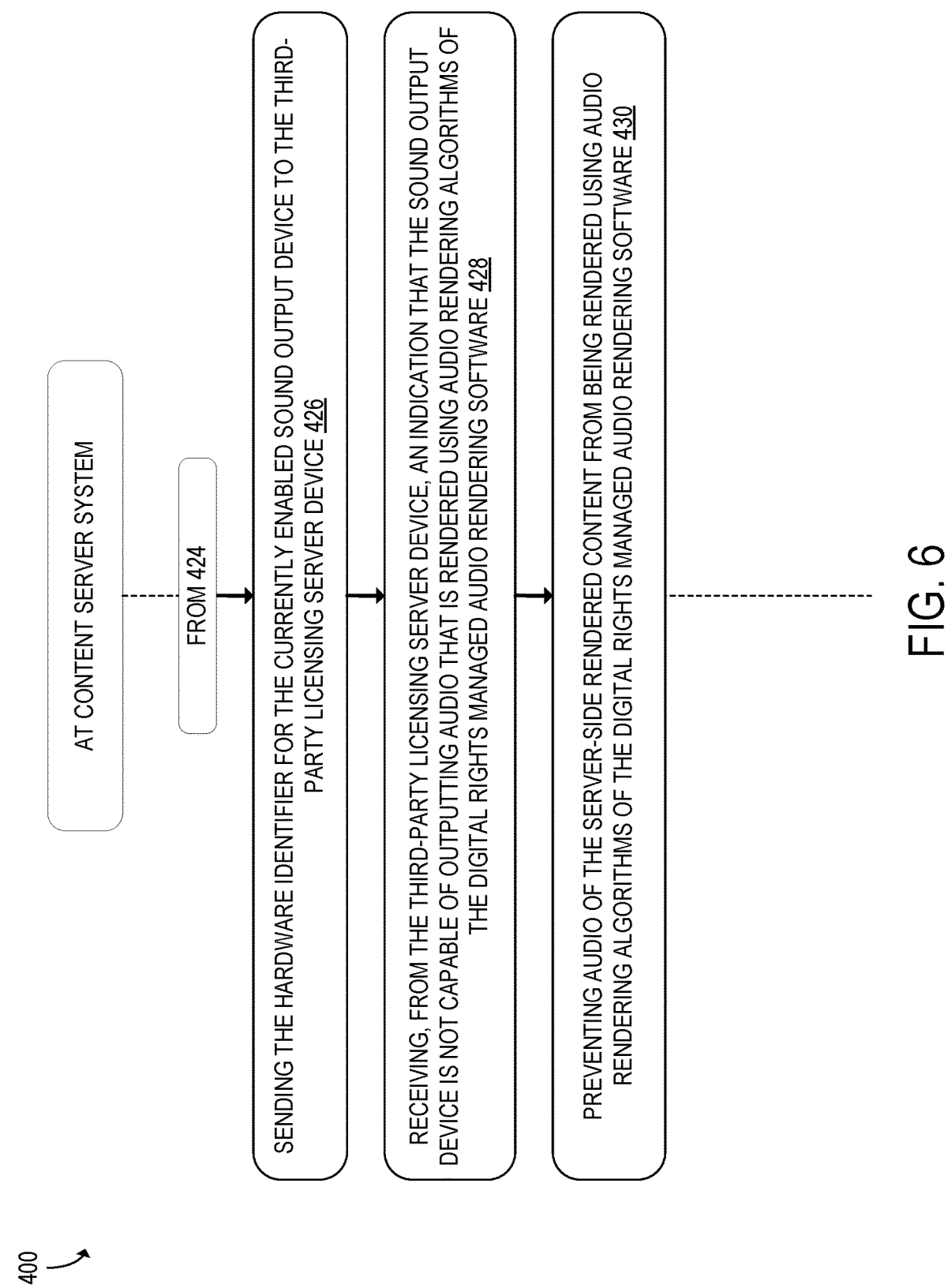
FIG. 6 continues the example method of FIG. 4.

FIG. 4 shows a flowchart for a computer implemented method 400 for rendering audio using digital rights managed audio rendering software. At 402, at a processor of a client computing device, the method 400 may include programmatically retrieving a licensing identifier from a sound output device or client computing device. As illustrated with reference to FIG. 2, the licensing identifier may be a hardware identifier of the sound output device associated with the client computing device. The hardware identifier may be a manufacturer serial number, or another type of identifier that may be used to identify whether a sound output device is currently licensed under an OEM licensing agreement between a third-p arty that owns a digital right managed audio rendering software and the manufacturer of the sound output device connected to the client computing device. In another example, the licensing identifier may be a hardware identifier of the client computing device. The hardware identifier may be a manufacturer serial number, or another type of identifier that may be used to identify whether the client computing device is currently licensed under an OEM licensing agreement between a third-party that owns a digital right managed audio rendering software and the manufacturer of the client computing device. However, it should be appreciated that other types of licensing identifiers may be used, such as, for example, hardware identifiers for other computer components such as a sound processing device.

At 404, the method 400 may include detecting a sound output device that is currently enabled for audio playout for the client computing device. As discussed above, multiple sound output devise may be coupled to the client computing device, For example, a mobile computing device may include speakers that are integrated into a housing of the mobile computing device in addition to a headset that is plugged into a port of the mobile computing device. The client computing device may identify the sound output device that is currently enabled for audio playout.

At 406, the method 400 may include sending the licensing identifier to the content server system over the computer network, and sending a hardware identifier for the currently enabled sound output device to the content server system. At 408, at a processor of a content server system, the method 400 may include receiving the licensing identifier and the hardware identifier for the currently enable sound output device from the client computing device.

At 410, the method 400 may include storing a user account for a user at a content server of the content server system that is configured to serve server-side rendered content to a client computing device of the user, audio from the server-side rendered content being played out via a sound output device associated with the client computing device. In one example, the server-side rendered content may be a game application that includes visuals and audio. The audio may be rendered by the content server system is streams to the client computing device for playout from the sound output device.

At 412, the method 400 may include determining a licensing identifier associated with the user. In one example, the licensing identifier may include the licensing identifier that was received from the client computing device at step 408. In this example, the licensing identifier may be a hardware identifier stored in memory at the sound output device or client computing device. In another example, the licensing identifier may be an account identifier for the user account stored at step 410. In this example, the user may purchase or obtain a license for a digital rights managed audio rendering software through the content server system, and the license may be associated with the account identifier of the user account, as discussed above with reference to FIG. 3.

At 414, the method 400 may include sending the licensing identifier to a third-party licensing server device. The third-party licensing server device is associated with the digital rights managed audio rendering software that may be used to render the audio of the server-side rendered content if permitted for the user.

At 416, the method 400 may include receiving, from the third-p arty licensing server device, an indication that an active license is associated with the licensing identifier. In one example, the third-party may have OEM licensing agreements with manufacturers of the sound output device and/or client computing device. The third-party licensing server device may compare the licensing identifier to a database of identifiers that are authorized under those OEM licensing agreements. As another example, the third-party licensing server device may, in an ad-hoc promotion, active temporary licenses for users.

At 418, the method 400 may include determining that the user is authorized to access a digital rights managed audio rendering software based on the indication that an active license is associated with the licensing identifier. The content server system may update the user account for the user to indicate that the user is permitted to use audio rendered by audio rendering algorithms of the digital rights managed audio rendering software associated with the active license.

At 420, the method 400 may include causing audio of the server-side rendered content to be rendered using audio rendering algorithms of the digital rights managed audio rendering software. In one example, the audio may be rendered by a server-side dedicated audio rendering processor of the content server system, as described above with reference to FIG. 3. In another example, the audio may be rendered by the processor of the content server device of the content server system.

At 422, the method 400 may include sending the rendered audio to the client computing device over the computer network. At 424, the method 400 may include receiving, at the client computing device, the rendered audio from the content server system 424. At 424, the method 400 may include playing out the rendered audio via the sound output device 424.

In one example, the user may enable a sound output device that is not capable of playing out audio rendered using the digital rights managed audio rendering software. In this example, the method 400 may further include step 426 including sending the hardware identifier for the currently enabled sound output device to the third-party licensing server device.

At 428, the method 400 may include receiving, from the third-p arty licensing server device, an indication that the sound output device is not capable of outputting audio that is rendered using audio rendering algorithms of the digital rights managed audio rendering software. For example, the third-party licensing server device may include a database of compatible sound output devices, and may be configured to check the hardware identifier for the currently enables sound output device against the database. The third-party licensing server device may send an indication back to the content server device of whether or not the currently enabled sound output device is capable of using the digital rights managed audio rendering software.

At 430, the method 400 may include preventing audio of the server-side rendered content from being rendered using audio rendering algorithms of the digital rights managed audio rendering software. Instead, the content server system may be configured to render the audio using a different audio rendering software that the sound output device is capable of using. The rendered audio may then be streamed to the client computing device for playout from the sound output device.

Figure 7:
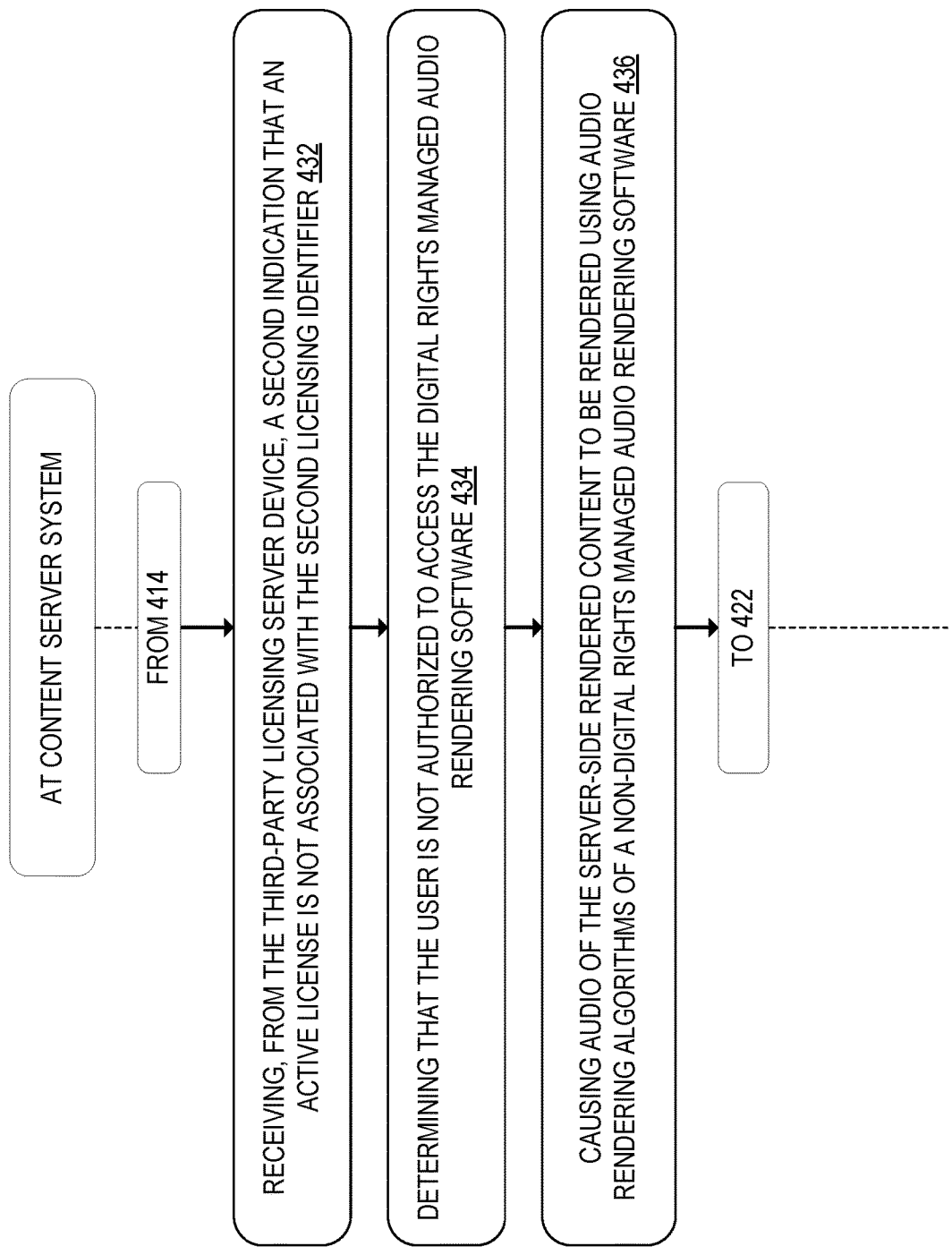
FIG. 7 continues the example method of FIG. 4.

In some examples, an active license may not be associated with the licensing identifier of the user. For example, steps 402-414 of method 400 may be performed for a second user of a second client computing device with a second user account. FIG. 7 shows an alternative branch from step 414 of method 400. At 432, the method 400 may include receiving, from the third-party licensing server device, a second indication that an active license is not associated with the second licensing identifier.

Continuing the alternative branch to step 434, the method 400 may include determining that the user is not authorized to access the digital rights managed audio rendering software based on the second indication that an active license is not associated with the second licensing identifier.

At 436, the method 400 may include causing audio of the server-side rendered content to be rendered using audio rendering algorithms of a non-digital rights managed audio rendering software. The non-digital rights managed audio rendering software may, for example, be a first party audio rendering software of the content server system. After rendering the audio, the alternative branch of method 400 may continue to step 422.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
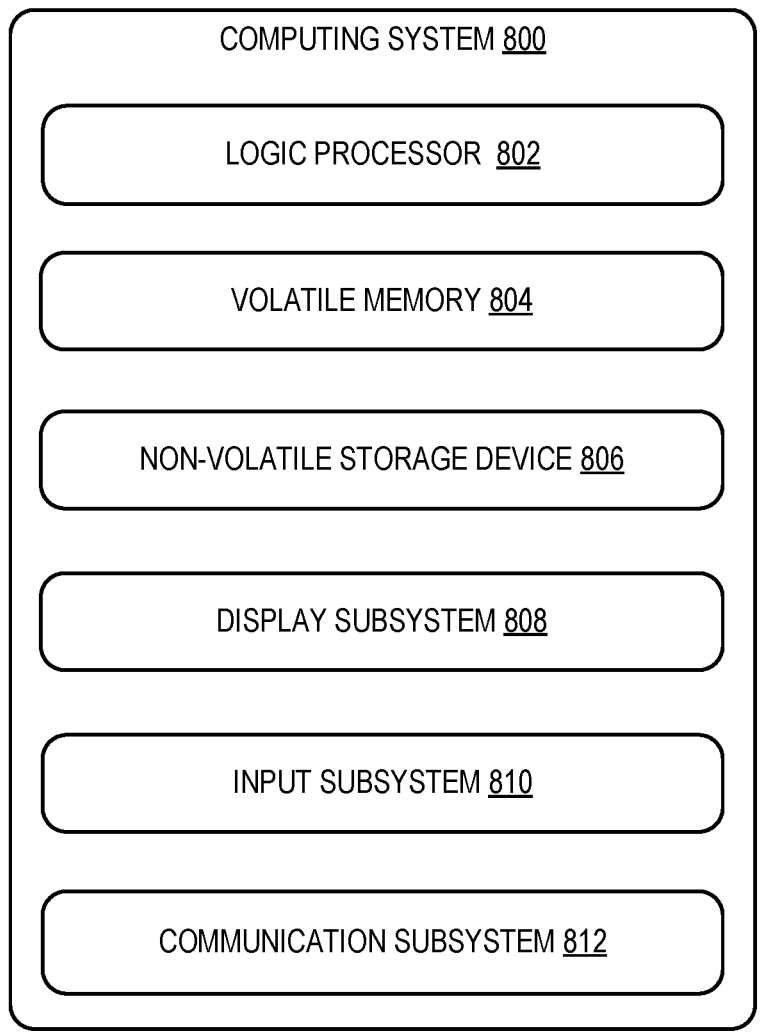
FIG. 8 shows a schematic view of an example computing environment in which the computing device of FIG. 1 may be enacted.

FIG. 8 schematically shows a non-limiting embodiment of a computing system 800 that can enact one or more of the methods and processes described above. Computing system 800 is shown in simplified form. Computing system 800 may embody the content server system 18, client computing device 12, and other computing devices described above and illustrated in FIGS. 1, 2, and 3. Computing system 800 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a content server system comprising at least one processor. The at least one processor is configured to store a user account for a user at a content server of the content server system that is configured to serve server-side rendered content to a client computing device of the user. Audio from the server-side rendered content is played out via a sound output device associated with the client computing device. The at least one processor is further configured to determine a licensing identifier associated with a device of the user or the user account of the user, send the licensing identifier to a third-party licensing server device, and receive, from the third-party licensing server device, an indication that an active license is associated with the licensing identifier. The at least one processor is further configured to determine that the user is authorized to access a digital rights managed audio rendering software based on the indication that an active license is associated with the licensing identifier, and cause audio of the server-side rendered content to be rendered using audio rendering algorithms of the digital rights managed audio rendering software. In this aspect, additionally or alternatively, the at least one processor may be further configured to store a second user account for a second user at the content server of the content server system, determine a second licensing identifier associated with the second user, send the second licensing identifier to the third-party licensing server device, and receive, from the third-party licensing server device, a second indication that an active license is not associated with the second licensing identifier. The at least one processor may be further configured to determine that the user is not authorized to access the digital rights managed audio rendering software based on the second indication that an active license is not associated with the second licensing identifier, and cause audio of the server-side rendered content to be rendered using audio rendering algorithms of a non-digital rights managed audio rendering software. In this aspect, additionally or alternatively, the licensing identifier may be stored at the sound output device or client computing device and received at the content server system, or stored at the content server system. In this aspect, additionally or alternatively, the licensing identifier may be a hardware identifier of the sound output device associated with the client computing device. In this aspect, additionally or alternatively, the licensing identifier may be a hardware identifier of the client computing device. In this aspect, additionally or alternatively, the licensing identifier may be an account identifier associated with the user account for the user stored by the content server system. In this aspect, additionally or alternatively, the at least one processor may be further configured to receive a hardware identifier for the sound output device that is currently enabled for audio playout for the client computing device, send the hardware identifier to the third-party licensing server device, and receive, from the third-party licensing server device, an indication that the sound output device is not capable of outputting audio that is rendered using audio rendering algorithms of the digital rights managed audio rendering software. The at least one processor may be further configured to prevent audio of the server-side rendered content from being rendered using audio rendering algorithms of the digital rights managed audio rendering software. In this aspect, additionally or alternatively, the audio may be rendered by a dedicated audio rendering processor of the content server system and streamed to the client computing device over a computer network. In this aspect, additionally or alternatively, the content server system may further comprise a client application program configured to be executed via a processor of the client computing device. The client application program may be configured to programmatically retrieve the licensing identifier from the sound output device or client computing device, and send the licensing identifier to the content server system over the computer network. In this aspect, additionally or alternatively, the client application program may be further configured to detect a sound output device that is currently enabled for audio playout for the client computing device, and send a hardware identifier for the currently enabled sound output device to the content server system.

Another aspect provides a method comprising, at a processor of a content server system, storing a user account for a user at a content server of the content server system that is configured to serve server-side rendered content to a client computing device of the user, audio from the server-side rendered content being played out via a sound output device associated with the client computing device. The method further comprises determining a licensing identifier associated with a device of the user or the user account of the user, sending the licensing identifier to a third-party licensing server device, and receiving, from the third-party licensing server device, an indication that an active license is associated with the licensing identifier. The method further comprises determining that the user is authorized to access a digital rights managed audio rendering software based on the indication that an active license is associated with the licensing identifier, and causing audio of the server-side rendered content to be rendered using audio rendering algorithms of the digital rights managed audio rendering software. In this aspect, additionally or alternatively, the method may further comprise storing a second user account for a second user at the content server of the content server system, determining a second licensing identifier associated with the second user, sending the second licensing identifier to the third-party licensing server device, and receiving, from the third-party licensing server device, a second indication that an active license is not associated with the second licensing identifier. The method may further comprise determining that the user is not authorized to access the digital rights managed audio rendering software based on the second indication that an active license is not associated with the second licensing identifier, and causing audio of the server-side rendered content to be rendered using audio rendering algorithms of a non-digital rights managed audio rendering software. In this aspect, additionally or alternatively, the licensing identifier may be stored at the sound output device or client computing device and received at the content server system, or stored at the content server system. In this aspect, additionally or alternatively, the licensing identifier may be selected from the group consisting of a hardware identifier of the sound output device associated with the client computing device, a hardware identifier of the client computing device, and an account identifier associated with the user account for the user stored by the content server system. In this aspect, additionally or alternatively, the method may further comprise receiving a hardware identifier for the sound output device that is currently enabled for audio playout for the client computing device, sending the hardware identifier to the third-party licensing server device, and receiving, from the third-party licensing server device, an indication that the sound output device is not capable of outputting audio that is rendered using audio rendering algorithms of the digital rights managed audio rendering software. The method may further comprise preventing audio of the server-side rendered content from being rendered using audio rendering algorithms of the digital rights managed audio rendering software. In this aspect, additionally or alternatively, the audio may be rendered by a dedicated audio rendering processor of the content server system and streamed to the client computing device over a computer network. In this aspect, additionally or alternatively, the method may further comprise at a processor of the client computing device programmatically retrieving the licensing identifier from the sound output device or client computing device, and sending the licensing identifier to the content server system over the computer network. In this aspect, additionally or alternatively, the method may further comprise, at the processor of the client computing device, detecting a sound output device that is currently enabled for audio playout for the client computing device, and sending a hardware identifier for the currently enabled sound output device to the content server system.

Another aspect provides a content server system comprising at least one processor. The at least one processor is configured to, store a user account for a user associated with a client computing device that is configured to render audio for playout via a sound output device associated with the client computing device, and determine a licensing identifier associated with the user. The licensing identifier is stored at the sound output device or client computing device and received at the content server system, or stored at the content server system. The at least one processor is further configured to send the licensing identifier to a third-party licensing server device, and receive, from the third-party licensing server device, an indication that an active license is associated with the licensing identifier. The at least one processor is further configured to determine that the user is authorized to access a digital rights managed audio rendering software based on the indication that an active license is associated with the licensing identifier, and send an authorization to the client computing device to cause the client computing device to render audio using audio rendering algorithms of the digital rights managed audio rendering software. In this aspect, additionally or alternatively, the licensing identifier may be selected from the group consisting of a hardware identifier of the sound output device associated with the client computing device, a hardware identifier of the client computing device, and an account identifier associated with the user account for the user stored by the content server system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system configured to enable rendering of audio for a computing device, the system comprising:
a processor; and
a storage device including instructions that, when executed by the processor, cause the system to:
determine a licensing identifier associated with the computing device;
send the licensing identifier to a third-party licensing device;
receive, from the third-party licensing device, an indication that an active license is associated with the licensing identifier;
determine, based at least in part on the indication that the active license is associated with the licensing identifier, that the computing device is authorized to access a digital rights managed audio rendering software; and
cause the audio to be rendered using an audio rendering algorithm of the digital rights managed audio rendering software.

2. The system of claim 1, wherein the licensing identifier is received from the computing device.

3. The system of claim 1, wherein the licensing identifier is stored in an account associated with the computing device.

4. The system of claim 1, wherein the licensing identifier comprises a hardware identifier for an audio output device connected to the computing device.

5. The system of claim 4, wherein the audio output device comprises a headset.

6. The system of claim 1, wherein the licensing identifier comprises an account identifier for an account associated with the computing device.

7. The system of claim 1, wherein causing the audio to be rendered using the audio rendering algorithm of the digital rights managed audio rendering software comprises:
using a dedicated audio rendering processor of the system to render the audio; and
streaming the rendered audio to the computing device over a network.

8. The system of claim 1, wherein causing the audio to be rendered using the audio rendering algorithm of the digital rights managed audio rendering software comprises sending an authorization to the computing device, the authorization enabling the computing device to render the audio using the audio rendering algorithm of the digital rights managed audio rendering software.

9. A system configured to enable rendering of audio for a computing device, the system comprising:
- a processor; and
- a storage device including instructions that, when executed by the processor, cause the system to:
  - determine a licensing identifier associated with the computing device;
  - send the licensing identifier to a third-party licensing device;
  - receive, from the third-party licensing device, an indication that an active license is not associated with the licensing identifier;
  - determine, based at least in part on the indication that the active license is not associated with the licensing identifier, that the computing device is not authorized to access a digital rights managed audio rendering software; and
  - cause the audio to be rendered using an audio rendering algorithm of a non-digital rights managed audio rendering software.

10. The system of claim 9, wherein the licensing identifier is received from the computing device.

11. The system of claim 9, wherein the licensing identifier is stored in an account associated with the computing device.

12. The system of claim 9, wherein the licensing identifier comprises a hardware identifier for an audio output device connected to the computing device.

13. The system of claim 12, wherein the audio output device comprises a headset.

14. The system of claim 9, wherein the licensing identifier comprises an account identifier for an account associated with the computing device.

15. The system of claim 9, wherein causing the audio to be rendered using the audio rendering algorithm of the non-digital rights managed audio rendering software comprises:
- using a dedicated audio rendering processor of the system to render the audio; and
- streaming the rendered audio to the computing device over a network.

16. A system configured to enable the rendering of audio for a computing device, the system comprising:
- a processor; and
- a storage device including instructions that, when executed by the processor, cause the system to:
  - receive a hardware identifier for an audio output device that is currently enabled to output audio via the computing device;
  - send the hardware identifier to a third-party licensing device;
  - receive, from the third-party licensing device, an indication that the audio output device is not capable of outputting the audio in an event the audio is rendered using a first audio rendering algorithm of a digital rights managed audio rendering software; and
  - cause, based at least in part on the indication that the audio output device is not capable of outputting the audio in the event the audio is rendered using the first audio rendering algorithm of the digital rights managed audio rendering software, the audio to be rendered using a second audio rendering algorithm of a non-digital rights managed audio rendering software.

17. The system of claim 16, wherein the hardware identifier is received from the computing device or stored in an account associated with the computing device.

18. The system of claim 16, wherein causing the audio to be rendered using the second audio rendering algorithm of the non-digital rights managed audio rendering software comprises:
- using a dedicated audio rendering processor of the system to render the audio; and
- streaming the rendered audio to the computing over a network.

19. The system of claim 16, wherein the audio output device is currently enabled to output the audio via the computing device based on a user selection of the audio output device from a plurality of audio output devices configured to output the audio.

20. The system of claim 16, wherein the audio output device comprises a headset.

* * * * *